C. P. O'BRIEN.
INDICATING ATTACHMENT FOR VEHICLES.
APPLICATION FILED AUG. 3, 1915.
1,216,482.  
Patented Feb. 20, 1917.
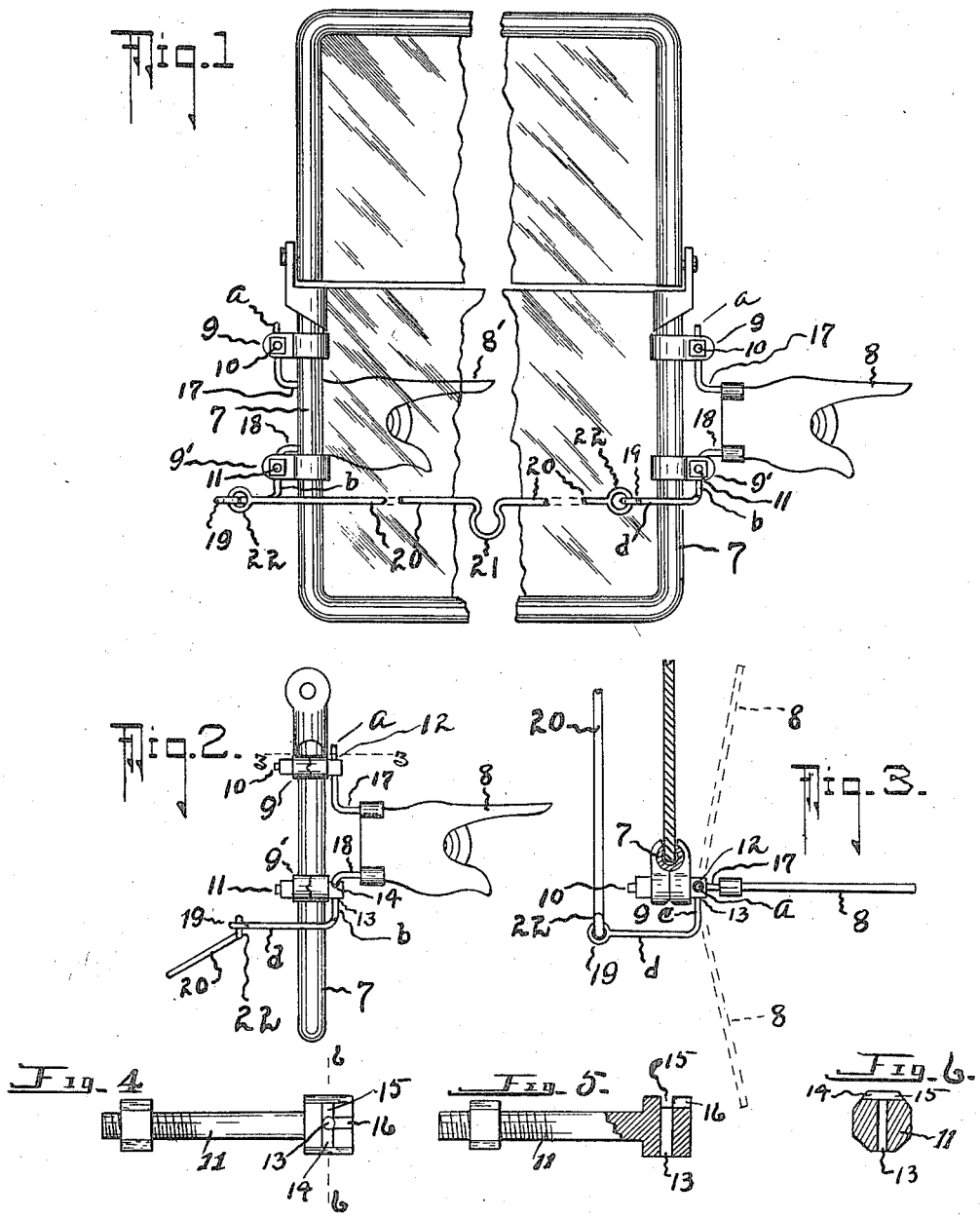

UNITED STATES PATENT OFFICE.

CORNELIUS P. O'BRIEN, OF OMAHA, NEBRASKA.

INDICATING ATTACHMENT FOR VEHICLES.

1,216,482.   Specification of Letters Patent.   Patented Feb. 20, 1917.

Application filed August 3, 1915. Serial No. 43,493.

*To all whom it may concern:*

Be it known that I, CORNELIUS P. O'BRIEN, a citizen of the United States, residing at Omaha, in the county of Douglas and State of Nebraska, have invented certain new and useful Improvements in Indicating Attachments for Vehicles, of which the following is a specification.

This invention relates to an indicating attachment for vehicles, and more particularly for motor vehicles. It has for its object to provide visible indices which may be mounted upon the vehicle in a manner to be under convenient control of a driver for being swung horizontally at an angle to the line of travel for indicating to others the direction in which the vehicle is to be driven, so that accidental collisions or injuries may be avoided, especially when the vehicle is to be driven upon curves or at street intersections.

On account of the speed at which motor vehicles are usually driven and the uncertainty as to the direction which may be chosen by drivers at street crossings, frequent accidents have occurred, and it is now a custom or rule for a driver to raise his arm either to the right or left, to visibly indicate to others the curve or direction which he intends to drive. The construction shown herein has been found to be of advantage since, by its use, the hands of the driver may be free for the control of the various devices required for a proper management of the vehicle.

With the foregoing objects in view, the invention presents a novel construction, combination and arrangement of parts as described herein and claimed, and as illustrated in the accompanying drawing.

In the drawing, Figure 1 is a broken away view of the frame of a wind shield for a motor vehicle, with the indicating attachment applied thereto. Fig. 2 is a detail relating to Fig. 1, showing an edgewise view of the lower section of the wind shield and one of the indices, the frame and the clamps being shown at right angles to the view illustrated in Fig. 1. Fig. 3 is a plan view of parts, being a section on line 3 3 of Fig. 2. Fig. 4 is a plan view of an alining bolt. Fig. 5 is a side view of an alining bolt partly in section. Fig. 6 is a transverse section of the alining bolt, on line 6 6 of Fig. 4.

Referring now to the drawing for a more particular description, numeral 7 indicates an upright support or frame of the wind shield of a motor vehicle, upon which are mounted the indices 8 and 8' so arranged that they may be swung horizontally, either to the right or left of the line of travel and maintained in either of those positions as long as required, or may be maintained in alinement or parallel with the line of travel.

Each of the indices may consist of any suitable, attenuated object having a length or area sufficient to be readily seen by pedestrians or drivers of vehicles upon or near the intersections of streets or highways, the form of a hand with pointing finger, as shown, being preferred.

The indices may be mounted upon the vehicle, at the sides thereof, by any suitable means so that they may be moved simultaneously in the same direction in an arc substantially of 180 degrees, the ends of the frame for the wind shield being preferred for said mounting, with the parts so arranged that the swinging movements of the indices may occur at the front of said wind shield. The means shown herein, and preferred, consist of a plurality of clamps which are arranged in pairs, as the upper pairs of clamps 9 and the lower pairs 9' mounted upon the ends of the frame 7, the clamps of each upper pair being compressed by means of a screw bolt 10, and the clamps of each lower pair being compressed by a screw bolt 11, so that they will be held upon the frame and that a screw bolt 10 and a screw bolt 11 will be disposed horizontally, and substantially in a vertical plane, adjacent to each other upon each end of the wind shield.

Each horizontal bolt 10 is provided with a head having an aperture 12 (Figs. 2. 3.) formed therein at right angles to its longitudinal axis. Each horizontal bolt 11 is also formed with a similar aperture 13 formed in its head, and is provided with opposed channels 14 and 15, and with a channel 16 disposed at right angles to channels 14 and 15, all opening upon aperture 13.

The clamps, as shown in Fig. 1, are so arranged that the bolts will be disposed at right angles to the wind shield, with their heads at the front thereof, and therefore said bolts will be disposed parallel, or substantially so, with the line of travel; and the bolts are so disposed that their apertures 12 and 13 will be substantially in vertical alinement, the channels 14, 15 and 16 of bolts 11 being upon the upper sides of the heads thereof.

Each of the indices is provided at its upper part with a rearwardly projecting arm 17 having an angularly disposed part $a$ projecting upwardly for engaging in aperture 12 of a bolt 10, and each index is also provided with a rearwardly projecting arm 18 having an angularly disposed part $b$ projecting downwardly for engaging in an aperture 13 of a bolt 11, each part $b$ of said arm having an extension $c$ (Fig. 3.) disposed at substantially right angles to the part $b$ and to the index, said extension $c$ having a terminal part $d$ which is disposed substantially parallel with the index, and upon the terminal of each part $d$ is provided a hook or loop 19.

Numeral 20 indicates a link or operating bar preferably having a hand-piece 21 formed or provided midway between its ends, its terminals being provided with suitable keepers 22 for engagement with the terminal hooks or loops 19 of arms 18. Member 20 is disposed horizontally at the rear side of the wind shield, within convenient reach of the driver. When driving in a line without turning, the normal position of the rectilinear indices will be to the front, the parts of arms 18, adjacent to the indices, being disposed in channels 16.

It will be understood, that v'  n approaching a crossing, if the driver i?    ds to turn to the right, he may elevate the  erating-bar, which movement will cause the indices to be elevated sufficiently so that arms 18, or that portion of each arm adjacent to an index, will be free from a channel 16, and he will then move the operating-bar to the left, which will cause coincident swinging movements of the indices to the right, and the arms 18 will then engage within channels 15, the weight of the parts causing this engagement.

When the driver intends to cause the vehicle to move upon a curve to the left, it is obvious that the operating-bar must be moved to the right. By the means as described, a driver may adjust the operating-bar and indices before approaching a crossing to indicate in which direction he intends to guide the vehicle, and his hands will be free for operating the several devices usually employed for a control of the vehicle.

It will be noted that the indices move simultaneously, and that they will be mounted at a considerable distance apart, comparatively, so that they may be seen outwardly of the sides of the vehicle, this being an important feature, since the indices should be visible to "followers" or the drivers of other vehicles at the rear. Another feature of advantage is the fact that a driver, by use of the herein described attachment may readily give signals showing the intended movements for his vehicle which would otherwise be very inconvenient, since he is generally seated near one side of the vehicle and could not give a hand or arm signal except at  at side of the vehicle where seated.

While I have shown and described the indices mounted upon the frame of a wind shield, this is simply a preferred mounting, and I do not wish to be understood as limiting myself in this respect, for the attachment would be operative if mounted upon any suitable standard or upright supporting part of a vehicle.

Having fully described the several parts, a further explanation relating to operation is not necessary. What I claim and desire to secure by Letters Patent, is,—

An indicating attachment for vehicles, comprising, in combination with a pair of standards, a horizontal bolt on each standard, a second horizontal bolt on each standard disposed below and in the vertical plane of the first named bolt, each second bolt being provided with an aperture and having a recess in its upper side opening on one of its ends into said aperture, and provided with second recesses on its upper side disposed substantially at right angles to the first named recess and opening on said aperture, a pair of indices each being provided with an angular arm having a pivotal connection with a first named bolt and provided with a secondary angular arm disposed in the aperture of a second bolt, and a bar connecting the ends of the secondary arms, said bar being movable for causing simultaneous swinging movements of the indices, a part of each secondary arm moving into engagement with a recess of a second bolt.

In testimony whereof, I have affixed my signature in presence of two witnesses.

CORNELIUS P. O'BRIEN.

Witnesses:
  HIRAM A. STURGES,
  J. P. PALMER.